Sept. 16, 1952   F. L. ALBEN   2,610,586
LOCOMOTIVE TRUCK
Filed Jan. 10, 1950   3 Sheets-Sheet 1

WITNESSES:

INVENTOR
Frank L. Alben.
BY
ATTORNEY

Sept. 16, 1952                    F. L. ALBEN                    2,610,586
                              LOCOMOTIVE TRUCK
Filed Jan. 10, 1950                                          3 Sheets-Sheet 2
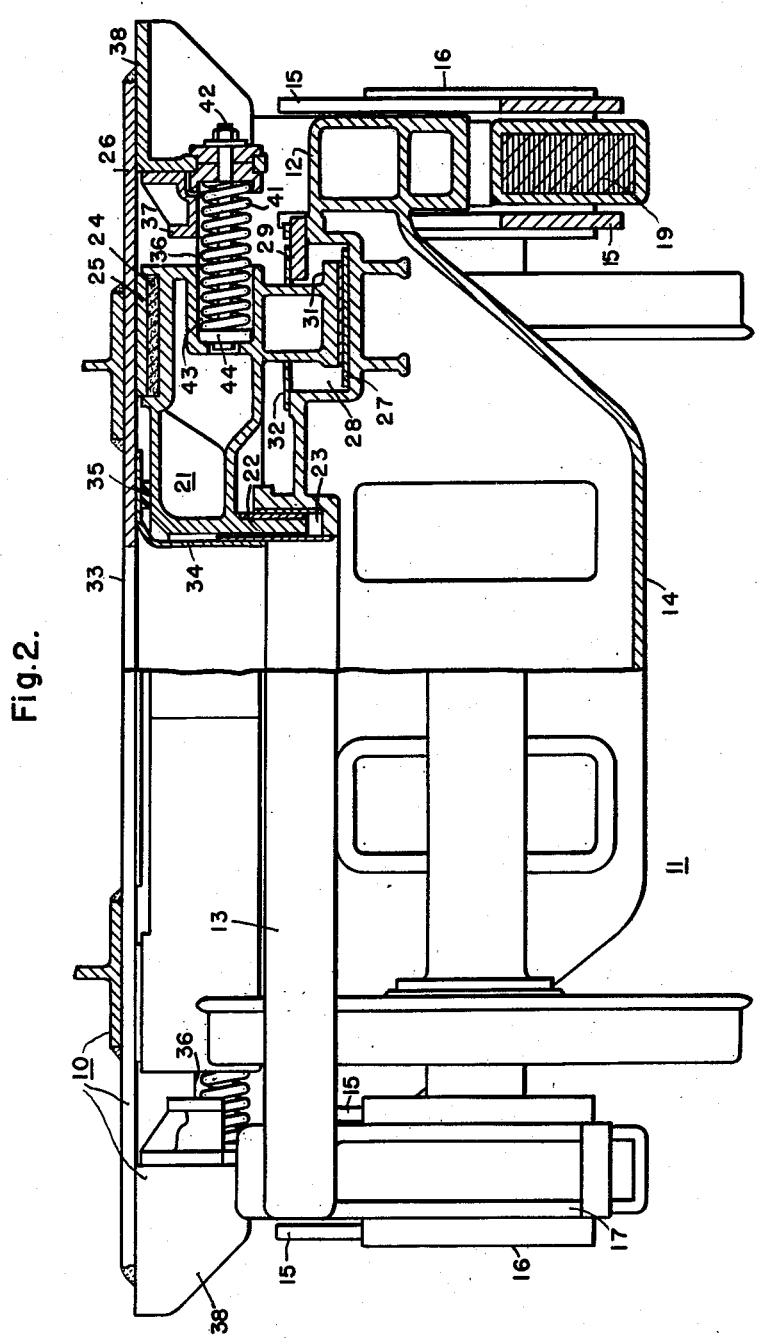
Fig. 2.
WITNESSES:
INVENTOR
Frank L. Alben.
BY
ATTORNEY

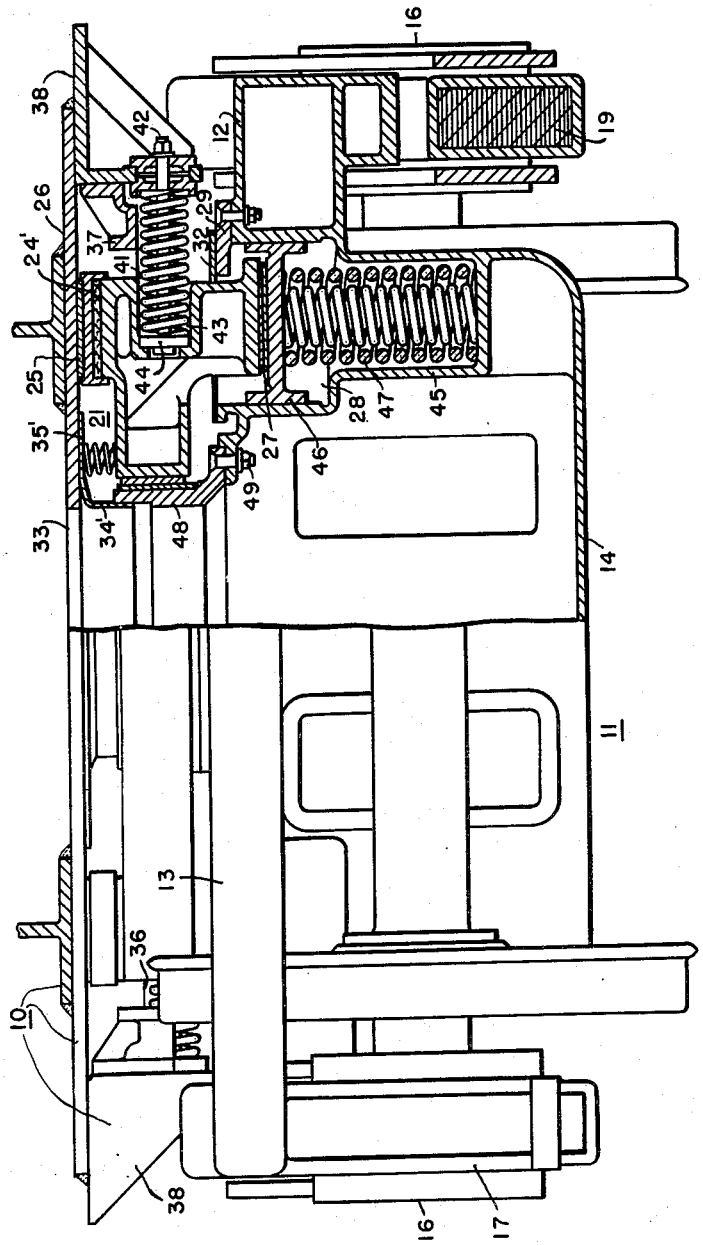

Patented Sept. 16, 1952

2,610,586

UNITED STATES PATENT OFFICE 2,610,586

LOCOMOTIVE TRUCK

Frank L. Alben, Pittsburgh, Pa., assignor to Westinghouse Electric Corporation, East Pittsburgh, Pa., a corporation of Pennsylvania Application January 10, 1950, Serial No. 137,736

4 Claims. (Cl. 105—189)

My invention relates, generally, to locomotive trucks and, more particularly, to locomotive trucks of the swivel type.

In order to meet competition for the locomotive business it is necessary to simplify the structure and reduce the cost of electric locomotives and at the same time increase their hauling power. One way to increase the hauling power of an electric locomotive is to increase its tractive effort by increasing the number of driving wheels and utilizing the weight on all of the wheels under a locomotive as adhesive weight.

The number of driving wheels under a locomotive can be increased by providing three or more four-wheel trucks under each cab of the locomotive. However, when more than two four-wheel trucks are provided under a locomotive cab the trucks must be of a special type or sub-frames must be utilized. The locomotive structure can be simplified and the cost reduced by eliminating the sub-frames.

An object of my invention, generally stated, is to provide a locomotive truck of the swivel type which shall be simple and efficient in operation and which may be economically manufactured and installed.

A more specific object of my invention is to provide an improved truck of the swivel type which shall be suitable for utilization in a locomotive or other railway vehicle, having a cab or a vehicle-underframe which is mounted directly on three or more trucks, as generally described and claimed in a copending application of W. A. Brecht, Serial No. 778,409, filed October 7, 1947.

Another object of my invention is to provide a laterally movable locomotive truck having a center pin carriage in which the center pin functions only as a pivot for the swivelling of the truck and does not carry any of the cab weight.

A further object of my invention is to provide a laterally movable locomotive truck having a center pin carriage through which the cab weight is supported by loading pads disposed on opposite sides of the centerline of the cab.

Still another object of my invention is to transmit the cab weight through the center pin carriage directly to the truck frame.

A still further object of my invention is to provide a center pin carriage which is movable vertically in a locomotive truck frame.

Other objects of my invention will be explained fully hereinafter or will be apparent to those skilled in the art.

In accordance with one embodiment of my invention, a locomotive-truck center-pin carriage is provided with sliding surfaces to permit the truck to move laterally relative to the cab underframe. Springs may be provided to restrain the lateral displacement of the end trucks of a locomotive having three or more trucks, as described and claimed in the previously mentioned Brecht application. The center pin does not carry any of the cab weight which is transmitted through loading pads in the carriage to the truck frame.

For a better understanding of the nature and objects of my invention, reference may be had to the following detailed description, taken in conjunction with the accompanying drawings, in which:

Fig. 2 is a view, partially in section and partially in end elevation, of the structure shown in Fig. 1, and Fig. 3 is a view similar to Fig. 2 of a modified truck structure.

Figure 1:
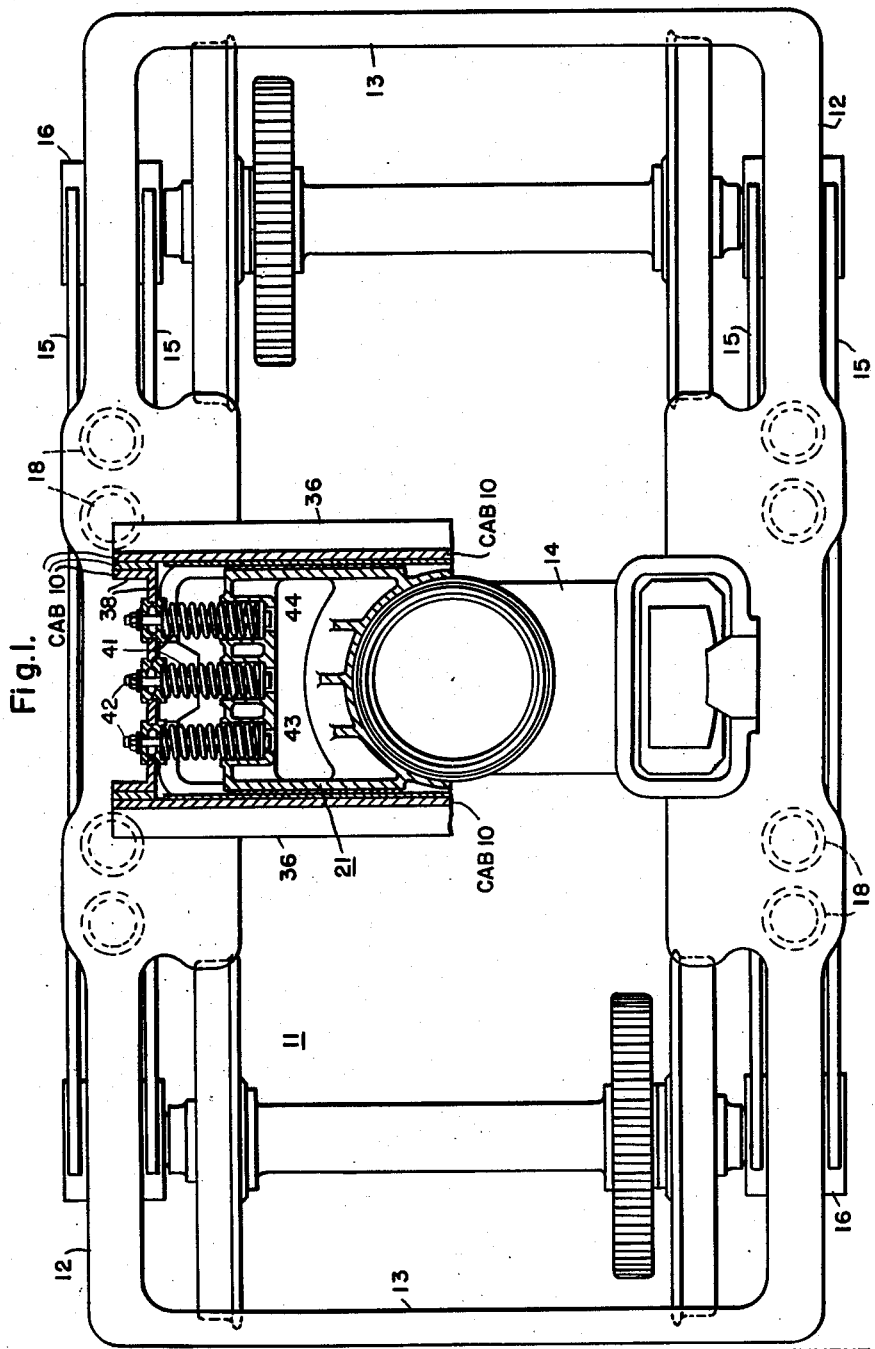
Figure 1 is a view, partially in plan and partially in section, of a small fragmentary under portion of a locomotive cab and the pertinent parts of a truck embodying the principal features of the invention.

Referring to the drawings the structure shown therein comprises a locomotive cab or other railway vehicle 10, only a small underframe portion of which is shown, and one of the three or more trucks 11 which support the cab 10. As shown, the illustrated truck 11 comprises side frame members 12 which are joined together by end frame members 13 and a centrally disposed cross-member 14 which may be formed integrally with the side frames 12.

As shown most clearly in Figure 1, two spaced longitudinally extending equalizer bars 15 are provided along each side of the truck. The ends of the equalizer bars rest on journal boxes 16 which are slidably disposed in pedestal jaws 17 on the truck frame. The spring load of the truck 11 is divided in a known manner between helical springs 18 (Fig. 1) and leaf springs 19 (Fig. 2) which are supported by the two pairs of equalizer-bars 15.

In order to permit the truck 11 to swivel, and also to move laterally relative to the cab 10 when negotiating horizontal curves, the weight of the cab 10 is supported by having its underframe rest slidably on the center-pin load-carrying carriages 21 of the respective cab-supporting trucks 11 which support said cab-underframe. Each center-pin load-carrying carriage 21 is swivelly supported on the cross member 14 of its truck 11. Thus, each center-pin carriage 21 is provided with a hollow depending cylindrical center-pin portion 22 which extends down into a cylindrical well 23 in the cross member 14.

As shown most clearly in Figure 2, underframing of the cab 10 rests upon loading pads 24 which are disposed on the carriage 21 on opposite sides of, and spaced laterally from, the longitudinal center line of the cab. The pads 24 are preferably composed of a sound deadening material. Bronze wearing plates 25 may be provided on top of the pads 24 to engage a steel underplate 26 which is provided on the bottom of the cab under-frame.

The weight of the cab 10 is transmitted to the carriage 21, which in turn rests on wearing-plates 27 which are disposed in pockets 28 which are carried by the truck 11 at points substantially underneath the respective cab-engaging loading pads 24. In this manner the cylindrical center-pin portion 22 of the carriage 21 functions only as a pivot for the swivelling of the truck and does not support any of the cab weight which is transmitted through the carriage 21 to the truck frame.

The cab-supporting loading pads 24 are sufficiently spaced, laterally from the longitudinal center line of the cab, to make it unnecessary to provide said bearings to prevent tilting of the cab. Metal plates 29 which overlap shoulders 31 on the carriage 21 may be secured to the cross member 14 of the truck 11, to retain the carriage 21 in position on the truck frame in case of derailment. It will be noted that sufficient clearance is provided between the side walls of the carriage-supporting pockets 28 and the carriage 21 to permit swivelling of the truck frame about the cylindrical portion 22. The carriage-supporting pockets 28 may be provided with cover plates 32 to retain a lubricant in the pockets.

In order to simplify the ventilation of the traction motors (not shown) which are preferably of the axle hung type in which each motor has one side mounted directly on the axle which it drives, the bottom cab plate 26 is provided with an opening 33 over the hollow cylindrical center-pin portion 22 of the carriage 21. Thus, air from blowers (not shown), which are located in the cab, may be forced downwardly, in a known manner, through the opening 33 and through the hollow cylindrical center-pin portion 22, into suitable ducts (not shown) which are connected to the traction motors. A flanged metal seal or retainer 34 may be provided between the cab plate 26 and the carriage 21 to retain a lubricant on the bronze wearing plates 25. The retainer 34 may be held in position by a resilient member 35.

As shown most clearly in Figure 1, each center-pin carriage 21 is slidably disposed under the cab 10, between two parallel transverse channel members 36 which are secured to the underframe of the cab 10. These pairs of channel guide-members 36 thus constitute means for guiding each of the cab-supporting center-pin carriages 21 with respect to the cab-underframe, so that each of the supporting-carriages for said underframe has some freedom of lateral motion but substantially no longitudinal or swiveling motions relative to said cab-underframe. Since the underplate 26 of the cab 10 is slidably mounted directly upon the loading pads 24 of each carriage 21, each carriage and its truck may move laterally relative to the cab. As shown in Figure 2, the lateral motions of the two end-trucks which support the cab are limited by stops 37 attached to side brackets 38, which, in turn, are attached to the ends of the cross-guides 36 and to the sides of the underframe-plate 26 of the cab 10 as shown in Figs. 1 and 2

In order to yieldably restrain the lateral motion of the end-trucks of a locomotive having more than two trucks, as broadly covered in the aforesaid copending application of W. A. Brecht, any suitable resilient means are provided. Thus, in the illustrated form of my present invention, this lateral-motion-restraining resilient means is shown in the form of spring members 41 which are attached to the brackets 38 of the cab 10, as by bolts 42, and having spring-ends which are disposed in pockets 43 provided in the center-pin carriage 21 of the truck 11. Plates 44 are slidably disposed on the bolts 42 to engage the bottoms of the pockets 43. Thus, the springs 41 are compressed by lateral movement of the carriage 21 relative to the cab 10, thereby restraining the lateral movement. In this manner, the lateral movement may be determined by the characteristics of the springs 41. It will be understood that resilient members composed of rubber or a similar material may be utilized instead of the springs 41.

As explained in the aforesaid co-pending application, the restraining springs 41 are provided only on the end-trucks of each locomotive cab. The lateral movements of the inner truck or trucks are preferably unrestrained by springs. In this manner the locomotive can negotiate horizontal curves regardless of the number of trucks provided under each cab. The springs 41 and the stop members 37 may be detached from the brackets 38, on the inner truck or trucks of a locomotive having more than two trucks, thereby permitting the center-pin carriage 21 to move freely laterally. Excessive lateral movement of the center-pin carriage 21 of such an inner truck will be limited when said carriage strikes the bracket 38 at either side of the cab.

Since the cab 10 rests on the loading pads 24 and moves horizontally across these pads there is no elevating of the center pin when negotiating curves. This is not true with trucks in which the center pin bolster is mounted on swing links which cause the bolster to be elevated when rounding curves. In the present structure the cab 10 merely moves in a horizontal plane on the loading pads without any elevating effect.

In the modification of the invention shown in Figure 3, in which like parts are designated by the same reference characters as in Figures 1 and 2, spring pockets 45 are provided in the cross member 14 underneath the pockets 28 for the wearing plates 27. As shown, the wearing plates 27 of the carriage rest upon H-shaped cross members 46 which are vertically slidably disposed in the pockets 28 of the truck. Helical springs 47 are provided in the pockets 45, underneath these cross members 46, thereby permitting the center pin carriage 21 to move vertically in the truck frame and providing additional spring flexibility which reduces weight transfer between trucks when going over vertical curves or depressions in the track.

In the structure shown in Figure 3 the center-pin carriage 21 engages the outside of an upstanding hollow cylindrical center-pin member 48 which is secured to the cross member 14 of the truck 11, by bolts 49. Thus, the carriage 21 may rotate about the center-pin member 48 to permit swivelling of the truck. The weight of the cab is supported by loading pads 24' which are of a slightly different construction than the pads 24 previously described. A flanged retainer 34' for retaining lubricant on the loading pads is slightly different from the retainer 34. Helical springs 35' are provided for retaining the retainer 34' in position. The carriage 21 is also of a slightly different construction but is generally the same as previously described. Otherwise, the truck shown in Figure 3 is similar to the one shown in Figures 1 and 2.

From the foregoing description it is apparent that I have provided an improved laterally movable truck having a center-pin carriage 21 in which the weight of the vehicle cab is transmitted through the carriage to the truck frame 11—12 through the friction-surfaces 26—25 (Figs. 2 and 3), and either 27—28 (Fig. 2) or 27—46 (Fig. 3), without the center pin 22 (Fig. 2) or 48 (Fig. 3) carrying any weight. Provision is made for restraining the lateral movement of the truck when it is so desired. The restraining springs 41 (Fig. 1) may be readily removed from, or added to, a truck, thereby permitting all of the trucks under a locomotive to be of the same general design, and permitting one truck to be readily substituted for another in case it is necessary to repair any of the trucks of a locomotive. The present truck is so constructed that a locomotive will operate properly over a track having both horizontal and vertical curves.

Since numerous changes may be made in the above-described construction, and different embodiments of the invention may be made, without departing from the spirit and scope thereof, it is intended that all matter contained in the foregoing description or shown in the accompanying drawings shall be interpreted as illustrative and not in a limiting sense.

I claim as my invention:

1. In a railway vehicle, the combination comprising: a plurality of trucks; a separate load-carrying carriage associated with each of said trucks; a vehicle-underframe resting on the load-carrying carriages of a series of at least three such trucks, including two end-trucks and at least one intermediately disposed truck; a center-pin assembly for swivelly guiding each load-carrying carriage on its truck without taking any substantial weight on the pin; horizontal weight-carrying thrust-engagement means, disposed laterally of, and separate from, the center-pin assembly, for transmitting the vertical load of each load-carrying carriage to its truck, while permitting the carriage to swivel on the center-pin with respect to the truck; other horizontal weight-carrying thrust-engagement means, disposed substantially straight above the previously mentioned horizontal weight-carrying thrust-engagement means, for transmitting the vertical load of the vehicle-underframe to the several load-carrying carriages, while permitting said carriages to move laterally with respect to the vehicle-underframe; guide-means carried by said vehicle-underframe for constraining each of said carriages to a substantially rectilinear translational movement laterally with respect to said vehicle-underframe, said guide-means permitting said carriage to move laterally with respect to said underframe so that each of the carriages which support said underframe has some freedom of a limited amount of lateral motion, said guide-means substantially preventing longitudinal swiveling motions of the carriage relative to the vehicle-underframe; and separate lateral restraint resilient means, disposed between the respective carriages of at least each end-truck and the vehicle-underframe, for restraining the relative lateral movements of said carriages with respect to the vehicle-underframe.

2. The invention as defined in claim 1, characterized by said lateral-restraint resilient means being associated with the respective center-pin carriages of only said two end-trucks.

3. The invention as defined in claim 1, characterized by one of said weight-carrying thrust-engagement means including resiliently backed horizontal plate-means for providing vertical resilience.

4. The invention as defined in claim 3, characterized by said lateral-restraint resilient means being associated with the respective center-pin carriages of only said two end-trucks.

FRANK L. ALBEN.

REFERENCES CITED

The following references are of record in the file of this patent:

UNITED STATES PATENTS

| Number | Name | Date |
|---|---|---|
| 777,575 | Wands | Dec. 13, 1904 |
| 948,067 | Taylor | Feb. 1, 1910 |
| 1,290,305 | O'Connor | Jan. 7, 1919 |
| 2,263,442 | Maris | Nov. 18, 1941 |
| 2,384,785 | Alben et al. | Sept. 18, 1945 |

FOREIGN PATENTS

| Number | Country | Date |
|---|---|---|
| 784,969 | France | July 30, 1935 |
| 486,270 | Great Britain | June 1, 1938 |